Figure 1:
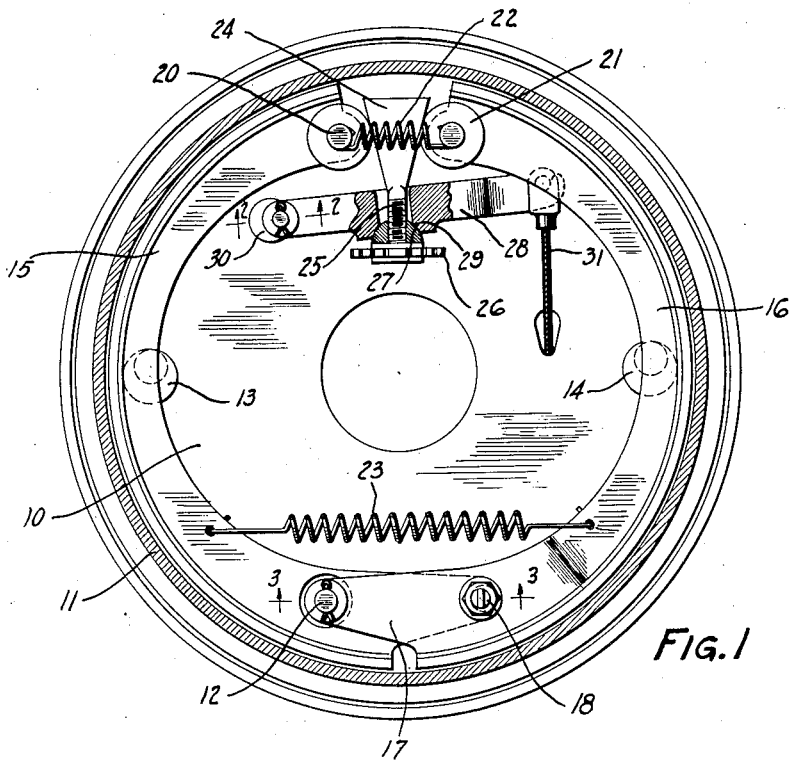

Sept. 6, 1932.   H. F. PARKER   1,875,391
BRAKE
Filed May 17, 1930

INVENTOR.
HUMPHREY F. PARKER
BY M. W. McConkey
ATTORNEY

Patented Sept. 6, 1932

1,875,391

UNITED STATES PATENT OFFICE

HUMPHREY F. PARKER, OF SOUTH BEND, INDIANA, ASSIGNOR TO BENDIX BRAKE COMPANY, OF SOUTH BEND, INDIANA, A CORPORATION OF ILLINOIS

BRAKE

Application filed May 17, 1930. Serial No. 453,391.

This invention relates to brakes and more particularly to internal expanding brakes.

An object of the invention is to provide means for actuating the friction elements of a brake.

Another object of the invention is to provide means for actuating the friction elements of a brake with equal action between them.

Another object of the invention is to provide an adjustable actuating means for the friction elements of a brake so that the friction elements may be adjusted to compensate for wear.

A further object of the invention is to provide means for operating the friction elements of a brake with an equal action between them regardless of the direction of rotation of the brake drum.

A further object of the invention is to provide an operating member for the friction elements of a brake having a delicate adjusting means and means associated therewith providing for shifting of the operating member to effectively actuate the friction elements regardless of their position.

Figure 2:
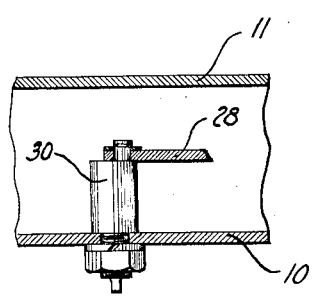
Figure 3:
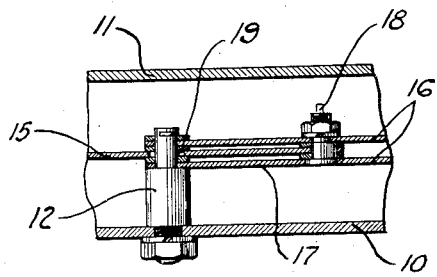

Other objects of the invention will appear from the following description taken in connection with the drawing, which forms a part of this specification, and in which:

Figure 1 is a sectional view of a brake just back of the head of the drum showing the friction elements and operating means in elevation, Figure 2 is a section substantially on line 2—2, Figure 1, and Figure 3 is a section substantially on line 3—3, Figure 1.

Referring to the drawing for more specific details of the invention, 10 represents a fixed support such as a backing plate having associated therewith a drum 11 which may be suitably secured to a wheel, not shown. Positioned on the backing plate is a fixed anchor 12 and suitable adjustable stops 13 and 14. A primary shoe 15 and a secondary shoe 16 are positioned on the anchor 12.

As shown, the secondary shoe 16 is provided with a bifurcated end 17 pivoted on the anchor 12 and the primary shoe 15 is pivoted between the bifurcated end 17 of the secondary shoe on an eccentric 18. This shoe has an opening 19 which engages the anchor 12 with sufficient clearance to provide for relative movement of the shoes. The primary and secondary shoes have positioned for rotation in their shouldered or separable ends suitable friction rollers 20 and 21.

As shown, the primary and secondary shoes are connected at their separable ends by a coil spring 22 and at their articulated ends by a coil spring 23. These springs serve to return the shoes to the off position when the brake is released and to retain them against the adjustable stops 13 and 14 in proper spaced relation to the radius of the drum.

Positioned between the friction rollers 20 and 21 is a wedge-shaped member 24 having an externally threaded stem 25 on which is mounted for travel a thumb nut 26 having a hemispherical face 27. Positioned on the stem 25 is a lever 28. This lever is provided with a recess or seat 29 engaging the hemispherical portion 27 on the thumb nut 26. The fulcrum end of the lever is pivoted on an adjustable eccentric 30 and the power applying end of the lever is suitably connected to an operating cable 31.

By adjusting the thumb nut 26 and the eccentric 30, the movement of the friction elements may be readily controlled, so that they will engage the radius of the drum with effective pressure. This structure lends itself perfectly to adjusting the friction elements to compensate for wear and for ideal operation thereof.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, friction members having separable ends arranged for movement on the support, an actuating member positioned for movement between said ends, an operating lever for moving said actuating member, an adjustable member on the fixed support, means eccentrically connecting one end of said lever to said adjustable member, a ball and socket connection between said actuating member and said lever, said connection being disposed between the ends of said lever, and operating means for said lever connected to the free end of said lever.

2. A braking device comprising a plurality of friction members, a wedge device for separating the ends of said friction members, a threaded shank on said wedge device, an adjusting member threaded on said shank, said adjusting member being provided with a spherical bearing surface, an adjustable member pivotally mounted adjacent said friction devices, an operating lever eccentrically connected to said adjustable member at one end of said lever, an opening in said lever between the ends thereof, said opening receiving said shank and cooperating with said spherical portion on said nut member, and operating means for said lever at the free end thereof.

In testimony whereof, I have hereunto signed my name.

HUMPHREY F. PARKER.